Patented Nov. 15, 1949

2,488,385

UNITED STATES PATENT OFFICE 2,488,385

SIZING COMPOSITIONS

Arthur C. Dreshfield, Chicago, Ill., assignor to Hercules Powder Company, Wilmington, Del., a corporation of Delaware No Drawing. Application March 23, 1945, Serial No. 584,496

13 Claims. (Cl. 106—230)

This invention relates to sizing compositions, and in particular concerns improved stabilized dry saponified rosin sizes.

As is well known, saponified rosin size may be prepared and utilized in a dry form. Such dry saponified rosin size usually is prepared by partially or completely saponifying rosin with concentrated aqueous alkali and spray drying the resultant mixture to form a light dry finely-divided product which is particularly adapted to use in sizing operations by reason of its ease and economy of shipment, the ease with which it may be dispersed or dissolved in water, its high rate of solution in water, and its high sizing efficiency. Dry saponified rosin size, however, has a strong tendency to oxidize and decompose spontaneously in the presence of air, particularly if it contains some free rosin or free alkali. For this reason, it has been found necessary to incorporate organic antioxidants in the size for the purpose of stabilizing it against such oxidation and decomposition. The use of certain organic amine antioxidants for this purpose has been described previously, as in United States Patents 2,294,723, 2,294,724, 2,294,725 issued on September 1, 1942, and others. These antioxidants, however, are expensive in comparison with the other ingredients of the size. Even though employed in relatively very small amounts, usually less than about 1.5 per cent by weight of the rosin used in preparing the size, they contribute materially to the cost of the size.

In addition to requiring the use of expensive antioxidants, the dry rosin size heretofore known has the further disadvantage of being inherently dusty and disagreeable to handle, particularly sinct it often contains a small proportion of free alkali. Because of their light, dry, fluffy nature, the size particles readily float in the air and thereby constitute an explosion and fire hazard as well as a source of discomfort and menace to the health of those who package or otherwise handle the size.

Now, in accordance with the present invention, it has been found that by incorporating from about 5 per cent to about 35 per cent, and preferably from about 15 per cent to about 25 per cent, based upon the weight of the entire composition, of a wax or wax-like material with the mixture of dry saponified rosin and secondary organic amine antioxidant, there may be obtained a saponified rosin size composition which serves to overcome the undesirable features heretofore associated with dry saponified rosin size. The improved size in which the present invention is embodied thus comprises saponified rosin stabilized with a suitable secondary organic amine in an amount sufficient to provide substantial resistance to oxidaton in the air, and a wax incorporated with the saponified rosin in an amount between about 5 per cent and about 35 per cent, and preferably between about 15 per cent and about 25 per cent, of the weight of the entire composition. The size compositions containing the wax in the stated amounts are relatively nondusty and are considerably more stable to oxidation than the stabilized rosin sizes heretofore known. The present invention therefore makes it possible to reduce appreciably the quantity of antioxidant required to obtain a desired degree of resistance to oxidation or decomposition, or, as may sometimes be desirable, to obtain a substantially higher degree of resistance to oxidation without increasing the amount of antioxidant above that which would be employed in the absence of the wax. In either case, the reduction in the amount of antioxidant necessary to obtain the desired resistance to oxidation reduces materially the contribution of the antioxidant to the total cost of the size composition. The invention furthermore serves largely to overcome the hazard and inconvenience heretofore attending the handling of this type of size. These advantages are attained without impairing the dispersibility of the composition in water, and without impairing the sizing efficiency of the size. As a matter of fact, the wax-containing dry sizes provided by the invention are in some respects superior in sizing value to the dry sizes heretofore known.

The following examples will illustrate several ways in which the principles of the present invention have been applied. In the examples, all quantities of materials are expressed in parts by weight unless otherwise specified.

EXAMPLE I

A mixture of 65 parts by weight of G gum rosin and 35 parts by weight of I wood rosin was charged into an oil-jacketed autoclave and heated to a temperature of about 175° C., after which 12.1 parts by weight of sodium hydroxide in the form of a concentrated aqueous solution was forced in at the bottom of the autoclave under pressure of about 120 lbs./sq. in. The mixture was heated at 150°-170° C. for about 10 minutes while venting the autoclave to maintain a pressure of about 110 lbs./sq. in., and a molten mixture of 28.8 parts by weight of paraffin and 0.3 part by weight of phenyl-beta-naphthylamine was then forced into the autoclave. Heating was continued for an additional 10 minutes, after which the mixture was allowed to discharge at a temperature of about 170° C. and under a pressure of about 120 lbs./sq. in. into a large drying chamber. The sizing composition so obtained was a substantially neutral dry saponified rosin size which was considerably less dusty than a similar size which contained no wax. An oxygen demand value determination on a sample of this composition showed it to have a 4-hour oxygen demand value of only about 0.14%.

EXAMPLE II

A mixture of 20.2 parts by weight of G gum rosin and 10.8 parts by weight of I wood rosin was saponified with 3.83 parts by weight of sodium hydroxide in a manner similar to that described in Example I. During the saponification reaction, a mixture of 8.9 parts by weight of ceresin wax and 0.6 part by weight of phenyl-beta-naphthylamine was added to the reaction mixture. The dry sizing composition so obtained contained 93.4 per cent by weight of solids, of which 0.5 per cent by weight was free rosin, and had a 4-hour oxyen demand value of 0.21%.

EXAMPLE III

Example II was repeated employing 8.9 parts by weight of Japan wax instead of the ceresin wax. A substantially neutral dry size having a 4-hour oxygen demand value of 0.45% was obtained.

EXAMPLE IV

Example II was repeated employing 8.9 parts by weight of montan wax instead of the ceresin wax. The dry size so obtained had a 4-hour oxygen demand value of 0.49%.

The following table presents the 4-hour, 24-hour, and 48-hour oxygen demand values of the sizing compositions prepared in the above examples in comparison with the corresponding values on similar sizes containing no wax and neither wax nor antioxidant, respectively. It will be noted that in all cases the wax-containing size was considerably more stable than the wax-free size, even though in some cases less antioxidant was employed.

The sizing compositions provided by the present invention, and as illustrated in the preceding and following examples, comprise finely-divided, discrete particles of saponified rosin-wax composition wherein the components are disposed in intimate association each with the others. The compositions in bulk contain the wax uniformly distributed throughout their mass. The individual particles of the composition comprise a surrounding medium composed largely of saponified rosin, and have distributed throughout their interior in generally uniform arrangement minutely divided particles of disperse medium composed largely of the wax or wax-like material. As shown particularly in the following examples, the compositions are readily wet by water and readily dispersed in water at a rate that compares very favorably with that of saponified rosin containing no wax. Further illustrative preparations of the present compositions are provided in the following examples.

*Table*

| Sample No. | Wax | | Antioxidant, Percent (Based on) Rosin) | Oxygen Demand, Percent | | |
|---|---|---|---|---|---|---|
| | Kind | Percent | | 4-hr. | 24-hr. | 48-hr. |
| I | Paraffin | 20 | 0.3 | 0.14 | 0.48 | 0.72 |
| II | Ceresin | 20 | 0.2 | 0.21 | 0.77 | 1.18 |
| III | Japan | 20 | 0.2 | | | 3.02 |
| IV | Montan | 20 | 0.2 | | | 3.53 |
| Same as I, but with wax omitted | | | 0.3 | 0.50 | 2.90 | 5.15 |
| Same as I, but with Wax and antioxidant omitted | | | | 2.10 | 6.20 | 7.80 |

EXAMPLE V

A mixture of 65 parts G gum rosin and 35 parts I wood rosin was saponified with sodium hydroxide in accordance with the method of Example I. During the saponification, a molten mixture of 25 parts paraffin wax and 0.3 part diphenylamine was forced into the autoclave. The resultant saponification mixture then was spray dried according to the method disclosed in Example I. The water dispersibility of the dry, finely-divided product then obtained was determined by placing a sample of the product in about 30 times its weight of water at approximately room temperature, and agitating rapidly until dispersion was effected. The product when tested in this manner was dispersed, with solution of the saponified rosin, in approximately 3 minutes. The dispersibility of the product thus compared very favorably with the dispersibility of ordinary dry size containing no wax.

EXAMPLE VI

One hundred parts of heat-treated I wood rosin was saponified with sodium hydroxide by treatment in a heated autoclave according to the process of Example I. During the saponification, a mixture of 20 parts by weight of paraffin wax and 0.3 part of diphenylamine was injected into the reaction mixture. After completion of the reaction, the mixture was spray dried in the usual manner. The resultant product was a substantially nondusty dry sizing composition, which had a stability to oxidation comparable to that of a wax-free dry size containing about 0.43 per cent of diphenylamine. The product was readily dispersible in water.

EXAMPLE VII

Example V was repeated employing an equal amount of Japan wax in place of the paraffin wax, and replacing the diphenylamine with an equal quantity of di-beta-naphthylamine. The final spray dried product was resistant to oxidation in the air and was substantially nondusty. The rosin size was readily dispersible in water and was found to have a high degree of sizing efficiency. Paper sized with the composition by addition to the beater exhibited a desirable freedom from wax spots and a high degree of sizing.

The following examples further illustrate certain embodiments of the present invention wherein antioxidants other than those of the preceding examples are employed, and wherein the relative proportions of the respective ingredients of the size composition are varied in accordance with the principles of the invention.

EXAMPLE VIII

A mixture of 65 parts by weight of G gum rosin and 35 parts by weight of I wood rosin was placed in an oil-jacketed autoclave and heated to a temperature of about 170° C. Following this, 12.1 parts by weight of sodium hydroxide in concentrated aqueous solution was injected into the autoclave under a pressure of about 120 lb./sq. in. The mixture was heated at 160° C. for about 15 minutes while venting the autoclave to maintain the pressure at about 110 lb./sq. in. A molten mixture of 28.8 parts by weight of paraffin and 0.5 part by weight of N-methyl-beta-naphthylamine then was forced into the autoclave. The mixture was heated for an additional 10 minutes and then allowed to discharge at a temperature of about 170° C. and under a pressure of about 120 lb./sq. in. into a large drying chamber. The saponified rosin size composition thus prepared was substantially neutral and was considerably less dusty and more stable to oxidation during storage than a similar size which contained no wax.

EXAMPLE IX

During the saponification of 100 parts by weight of heat-treated I wood rosin by the process described in Example I, a mixture of 25 parts by weight of paraffin wax and 0.25 part by weight of N-ethyl-beta-naphthylamine was added to the mixture of rosin and sodium hydroxide undergoing reaction. Upon completing the reaction and spray-drying the product in the usual manner, there was obtained a substantially nondusty dry sizing composition having a stability to oxidation comparable to that of a wax-free dry size containing 0.4 per cent by weight of the antioxidant.

EXAMPLE X

A mixture of 65 parts by weight of G gum rosin and 35 parts by weight of I wood rosin was saponified with concentrated aqueous sodium hydroxide in a heated autoclave and under pressure according to the method described in Example I. During the saponification reaction, a molten mixture of 28.8 parts by weight of paraffin and 0.5 part by weight of N,N'-di-phenyl-p-phenylenediamine was forced into the autoclave. Upon spray drying the mixture by the method of the aforesaid example, there was obtained a sizing composition which was substantially neutral, dry and substantially nondusty. The composition had a considerably higher resistance to oxidation during storage than a similar size which contained no wax.

EXAMPLE XI

A mixture of 20 parts by weight of G gum rosin and 11 parts by weight of I wood rosin was saponified with 3.8 parts by weight of sodium hydroxide in a manner similar to that described in Example VIII. During the saponification reaction, a mixture of 6 parts by weight of ceresin wax and 0.16 part by weight of N,N'-di-beta-naphthyl-p-phenylenediamine was added to the reaction mixture. The dry sizing composition so obtained was substantially nondusty and was stable to oxidation during storage.

EXAMPLE XII

During the saponification of 100 parts by weight of heat-treated I wood rosin by the process described in Example VIII, a mixture of 25 parts by weight of paraffin wax and 0.25 part by weight of N,N'-diphenyl-m-phenylenediamine was added to the mixture of rosin and sodium hydroxide undergoing reaction. Upon completing the reaction and spray-drying the product in the usual manner, there was obtained a substantially nondusty dry sizing composition having a stability to oxidation comparable to that of a wax-free dry size containing 0.4 per cent by weight of the antioxidant.

EXAMPLE XIII

A mixture of 65 parts by weight of G gum rosin, and 35 parts by weight of I wood rosin was charged into an oil-jacketed autoclave and heated to a temperature of about 175° C., after which 12.1 parts by weight of sodium hydroxide in the form of a concentrated aqueous solution was forced in at the bottom of the autoclave under a pressure of about 120 lb./sq. in. The mixture was heated at 150°–170° C. for about 10 minutes while venting the autoclave to maintain a pressure of about 110 lb./sq. in., and a molten mixture of 28.8 parts by weight of paraffin and 0.3 part by weight of N-phenyl-ac-tetrahydro-beta-naphthylamine was then forced into the autoclave. Heating was continued for an additional 10 minutes, after which the mixture was allowed to discharge at a temperature of about 170° C. and under a pressure of about 120 lb./sq. in. into a large drying chamber. The sizing composition so obtained was a substantially neutral dry saponified rosin size which was considerably less dusty and more stable to oxidation during storage than a similar size which contains no wax.

EXAMPLE XIV

A mixture of 20 parts by weight of G gum rosin and 11 parts by weight of I wood rosin was saponified with 3.8 parts by weight of sodium hydroxide in a manner similar to that described in Example XIII. During the saponification reaction, a mixture of 11.0 parts by weight of Japan wax and 0.16 part by weight of N-cyclohexylphenylamine was added to the reaction mixture. The dry sizing composition so obtained was substantially nondusty and was stable to oxidation during storage.

EXAMPLE XV

During the saponification of 100 parts by weight of heat-treated I wood rosin by the process described in Example XIII, a mixture of 25 parts by weight of paraffin wax and 0.25 part by weight of N-(beta-hydroxyethyl)-beta-naphthylamine (N-beta-naphthyl-ethanolamine) was added to the mixture of rosin and sodium hydroxide undergoing reaction. Upon completing the reaction and spray-drying the product in the usual manner, there was obtained a substantially nondusty dry sizing composition having a stability to oxidation comparable to that of a wax-free dry size containing 0.4 per cent by weight of the antioxidant. The sizing composition was readily dispersible in water.

As shown by the preceding examples, the saponified rosin size compositions which form the subject matter of the present invention may contain various waxes, or wax-like materials, and rosins of various types. The examples also illustrate that the proportion of the wax in the compositions may be varied within certain limits without detracting from the desirable characteristics of the compositions. Use of certain of the secondary aryl amine type antioxidants that have been found to be effective for stabilizing the saponified rosins of the invention against oxidation in the air also is illustrated in the examples.

As further shown in the examples, the present size compositions are obtained in the form of dry, finely-divided particles, and are characterized by their substantially nondusty condition and their ready dispersibility in water. The size compositions therefore are well suited to use in ordinary paper sizing operations, since they may be added directly to the beater, wherein they are rapidly and effectively dispersed in the paper stock suspension.

The wax employed in accordance with the invention may be a true wax, such as carnauba wax, candelilla wax, ceresin, beeswax, montan wax, Japan wax, etc. or, more preferably, it may be a wax-like hydrocarbon, such as the amorphous or microcrystalline paraffin waxes of varying melting points, crude scale wax, etc. Accordingly, it will be understood that the term "wax" as herein employed refers to such wax-like hydrocarbon materials of mineral origin as well as to the true vegetable waxes. Regardless of its nature, the wax is usually employed in an amount representing between about 5 and about 35, preferably between about 15 and about 25, per cent by weight of the entire composition, although the optimum proportion will depend somewhat upon the particular secondary diarylamine antioxidant employed, the desired degree of stabilization, the characteristics of the size itself, i. e., whether it is substantially neutral or contains some free rosin or free alkali, and the desired sizing characteristics.

The secondary organic amines which may be employed as the antioxidant in accordance with the present invention, may be either di-phenyl monoamines, dinaphthyl monoamines, mononaphthyl-monophenyl monoamines, N-monophenyl-substituted alicyclic monoamines, N-mononaphthyl-substituted alicyclic monoamines, N-mononaphthyl substituted lower aliphatic monoamines, or symmetrical N,N'-diaryl-substituted phenylenediamines. The compounds are further characterized by having the general formula

wherein R signifies an appropriate radical selected from the class consisting of phenyl, naphthyl, lower alkyl-phenyl, lower alkoxy-phenyl, lower alkyl-alkoxy-phenyl, and lower alkyl-naphthyl radicals, and wherein R' signifies an appropriate radical selected from the class consisting of phenyl, naphthyl, lower alkyl-phenyl, lower alkoxy-phenyl, lower alkyl-alkoxy-phenyl, lower alkyl-naphthyl, tetrahydronaphthyl, cyclohexyl, hydrocarbon-substituted cyclohexyl, lower alkyl, lower hydroxy-alkyl and N-aryl amino-phenyl radicals. The terms "di phenyl monoamines," "dinaphthyl monoamines," "monophenyl mononaphthyl monoamines," etc., refer to the amines which contain the naphthyl and/or phenyl radicals as the case may be, in either the unsubstituted or in the above indicated substituted forms. The terms "lower alkyl" and "lower hydroxy-alkyl" refer, respectively, to alkyl groups and hydroxy-alkyl groups containing less than five carbon atoms. Likewise, the terms "lower alkyl-phenyl," "lower alkoxy-phenyl," "lower alkyl-naphthyl," etc., refer to phenyl or naphthyl radicals bearing one or more alkyl and/or alkoxy substituents containing less than five carbon atoms.

Examples of di phenyl monoamines which thus may be employed as the antioxidant are diphenylamine, ditolylamine, 4,4'-dimethoxy-diphenylamine, 4,4'-dimethoxy-3-methyl-diphenylamine, 3-methoxy-3'-methyl-diphenylamine, 3-methoxy-diphenylamine, 3-isopropoxy-diphenylamine, 4,4' - di - isopropyl-diphenylamine, 2-butyl - diphenylamine, 4,4' - ditertiarybutyl-diphenylamine, etc.

Examples of di naphthyl monoamines which may be employed are, di-beta-naphthylamine, alpha-, beta-dinaphthylamine, 1,1'-dimethyl-di-beta-naphthylamine, 1-ethyl-di-beta-naphthylamine, etc. Representative mononaphthyl monophenyl monoamines which may be employed are phenyl - beta - naphthylamine, phenyl-alpha-naphthylamine, (4-ethoxy-phenyl)-alpha-naphthylamine, p - xenyl - alpha - naphthylamine, phenyl-beta-ar-tetrahydro-naphthylamine, and others. Examples of N-monophenyl-substituted alicyclic amines which may be employed as an antioxidant compound in the present compositions are N-cyclohexyl-phenylamine and N-(1-methyl-cyclohexyl)-phenylamine. Similarly representative N-mononaphthyl-substituted alicyclic amines which may be employed in accordance with the present invention are N-cyclohexyl - beta-naphthylamine, N-(1-methylcyclohexyl)-beta-naphthylamine.

Representative examples of N-monanaphthyl-substituted lower aliphatic amines which may be employed as antioxidants in the present compositions include N-methyl-beta-naphthylamine, N-ethyl-beta-naphthylamine, N-isopropyl-beta-naphthylamine, N - naphthyl - beta - hydroxy-ethanolamine, and similar compounds. Symmetrical N,N'-diaryl phenylenediamines which may be used in preparing the present compositions are N,N'-diphenyl-p-phenylenediamine, N,N' - diphenyl-m-phenylenediamine, N,N'-di-beta - naphthyl-p-phenylenediamine, N,N'- diphenyl - m - phenylenediamine, N,N'-di (o-isopropoxy-phenyl)-o-phenylenediamine, N,N'-di-(p-tolyl)-o-phenylenediamine, N,N'-di-(p-tert. butyl phenyl)-p-phenylenediamine, and the like.

Of the foregoing types of compounds, it is preferred to employ the di phenyl monoamines, the mononaphthyl monophenyl monoamines, or the N-mononaphthyl-substituted lower aliphatic amines. Such amines are in general more readily available and tend to be more effective as antioxidants than are the more complex compounds mentioned. The preferred individual compounds, because of their availability and effectiveness in stabilizing saponified rosin size compositions against oxidation in the air, are diphenylamine, phenyl-beta-naphthylamine, and N-methyl-beta-naphthylamine.

Heretofore, it was found necessary to employ such antioxidants in an amount representing between about 0.1 and about 1.5 per cent by weight of the rosin used in preparing the size in order to insure that the latter was substantially stable towards oxidation. A substantially equivalent degree of stabilization may be imparted to the wax-containing dry sizes provided by the present invention, however, by the use of only between about 0.05 and about 0.30 per cent of the antioxidant based on the weight of rosin used in preparing the size. For example, a typical dry size which had been stabilized by the addition of 0.42 per cent of phenyl-beta-naphthylamine was found to have a 24-hour oxygen demand value of about 0.50 per cent cent, whereas a sample of the same size to which had been added 20 per cent of paraffin wax and only 0.21 per cent of phenyl-beta-naphthylamine had a 24-hour oxygen demand value of about 0.48 per cent. Similar reductions in the amount of antioxidant required to provide substantial resistance to oxidation in the air also are found in the case of antioxidants other than phenyl-beta-naphthylamine. The optimum proportion of the antioxidant, like that of the wax, will depend somewhat upon the particular antioxidant, the desired degree of stabilization, and the characteristics of the size itself. It will also depend upon the proportion of wax employed.

The dry saponified rosin employed in preparing the new dry size compositions may be manufactured from any of the grades of wood or gum rosin, or mixtures thereof, or from rosin which has been partially polymerized by treatment with a polymerization catalyst. The rosin may likewise be one which has been subjected to heat-treatment prior to saponification to an extent sufficient to reduce its tendency to form acid abietate salts but insufficient to form decarboxylation products which are deleterious to sizing operations. Similarly, any caustic alkali, e. g. sodium or potassium hydroxide, may be employed as the saponifying agent, and the saponification reaction may be carried out in such a manner that the saponified product is substantially neutral or contains moderate excess of free alkali or free rosin.

The wax and antioxidant may be added to the saponified rosin at any time before, during, or after the saponified reaction, although it will usually be found that a more homogeneous and dustless product will be obtained if these ingredients are added before or during saponification. A preferred method of making the new compositions consists in incorporating the wax and antioxidant with the size during preparation of the latter by the process described in U. S. Patent No. 2,134,912. Such method essentially comprises introducing molten rosin into an autoclave and thereafter forcing a hot aqueous alkali solution of 25–50 per cent by weight concentration into the body of molten rosin under pressure while maintaining the mixture at a temperature of about 135°–190° C. and under its autogenic pressure. When the saponification is about one-half completed, the secondary diarylamine antioxidant is dispersed or dissolved in the molten wax, and the mixture is forced into the autoclave. Upon completion of the reaction, the mixture is allowed to discharge under its own pressure into a chamber maintained at or below about 78 per cent relative humidity, whereby it is instantly desiccated to a dry, noncaking powder having the antioxidant and wax uniformly dispersed therethrough. When a relatively large proportion, e. g. above about 20 per cent by weight, of the wax is employed, it may be desirable to add a portion thereof to the rosin before adding the saponifying alkali, and thereafter adding the remainder along with the antioxidant during the reaction as described above. The invention is not limited to such modes of operation, however, and other methods of making the compositions provided by the invention will be apparent to those skilled in the art.

In addition to being substantially nondusty and requiring the use of less antioxidant to render them stable to oxidation, the sizing compositions provided by the present invention have the particular advantage of being capable of direct addition to the beater in the sizing operation. The size compositions of the present invention are readily wet by water and do not tend to form insoluble, poorly dispersed lumps of solid material upon addition to water. The compositions are thus distinguished from finely-divided materials having a coating of wax on the individual particles since such coated finely-divided particles are not easily wet by water and are dispersed in water only with difficulty. The present compositions are rapidly and easily dispersed upon stirring into water, and when used in the sizing of paper do not form wax-spots on the paper. Heretofore, in wax-sizing paper stock, it has been deemed necessary to prepare separate aqueous solutions or dispersions of the rosin size and wax, and add them separately to the beater in order to avoid such wax spots. The use of the present compositions obviates the steps of forming and handling the aqueous wax and size dispersions, and simplifies the problems encountered in the preparation, storage, and use of such separate dispersions.

This application is a continuation-in-part of the copending applications Serial Numbers 409,353, 409,354, 409,355 and 409,359, all filed on September 3, 1941, now abandoned. Said applications, Serial Numbers 409,353, 409,354 and 409,355, are in turn continuations-in-part of application Serial Number 208,815, filed on May 19, 1938, now abandoned.

What I claim and desire to protect by Letters Patent is:

1. A nondusty dry saponified rosin size composition readily dispersible in water and resistant to oxidation in the air, comprising saponified rosin stabilized with a secondary organic amine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty, said secondary organic amine having the general formula

wherein R signifies an appropriate radical selected from the class consisting of phenyl, naphthyl, lower alkyl-phenyl, lower alkoxy-phenyl, lower alkyl-alkoxy-phenyl, and lower alkyl-naphthyl radicals, and R' signifies an appropriate radical selected from the class consisting of phenyl, naphthyl, lower alkyl-phenyl, lower alkoxy-phenyl, lower alkyl-alkoxy-phenyl, lower alkyl-naphthyl, tetrahydronaphthyl, cyclohexyl, hydrocarbon-substituted cyclohexyl, lower alkyl, lower hydroxy-alkyl and N-aryl aminophenyl radicals.

2. A nondusty dry saponified rosin size composition readily dispersible in water and resistant to oxidation in the air, comprising saponified rosin stabilized with a secondary organic amine in an amount sufficient to provide substantial resistance to oxidation in the air, and a paraffin wax incorporated with the saponified rosin in an amount between about 5 per cent and about 35 per cent by weight of the entire composition, said paraffin wax serving to increase the resistance of the composition to oxidation in the air and to render it substantially nondusty, said secondary organic amine having the general formula

wherein R signifies an appropriate radical selected from the class consisting of phenyl, naphthyl, lower alkyl-phenyl, lower alkoxy-phenyl, lower alkyl-alkoxy-phenyl, and lower alkyl-naphthyl radicals, and R' signifies an appropriate radical selected from the class consisting of phenyl, naphthyl, lower alkyl-phenyl, lower alkoxy-phenyl, lower alkyl-alkoxy-phenyl, lower alkyl-naphthyl, tetrahydronaphthyl, cyclohexyl, hydrocarbon-substituted cyclohexyl, lower alkyl, lower hydroxy-alkyl and N-aryl aminophenyl radicals.

3. A nondusty dry saponified rosin size composition readily dispersible in water and resistant to oxidation in the air, comprising saponified rosin stabilized with a secondary organic amine in an amount sufficient to provide substantial resistance to oxidation in the air, and a wax incorporated with the saponified rosin in an amount between about 15 per cent and about 25 per cent by weight of the entire composition, said wax serving to increase the resistance of the composition to oxidation in the air and to render it substantially nondusty, said secondary organic amine having the general formula

wherein R signifies an appropriate radical selected from the class consisting of phenyl, naphthyl, lower alkyl-phenyl, lower alkoxy-phenyl, lower alkyl-alkoxy-phenyl, and lower alkyl-naphthyl radicals, and R' signifies an appropriate radical selected from the class consisting of phenyl, naphthyl, lower alkyl-phenyl, lower alkoxy-phenyl, lower alkyl-alkoxy-phenyl, lower alkyl-naphthyl, tetrahydronaphthyl, cyclohexyl, hydrocarbon-substituted cyclohexyl, lower alkyl, lower hydroxy-alkyl and N-aryl aminophenyl radicals.

4. A nondusty dry saponified rosin size composition readily dispersible in water and resistant to oxidation in the air, comprising saponified rosin stabilized with a secondary organic amine in an amount sufficient to provide substantial resistance to oxidation in the air, and a paraffin wax incorporated with the saponified rosin in an amount between about 15 per cent and about 25 per cent by weight of the entire composition, said paraffin wax serving to increase the resistance of the composition to oxidation in the air and to render it substantially nondusty, said secondary organic amine having the general formula

wherein R signifies an appropriate radical selected from the class consisting of phenyl, naphthyl, lower alkyl-phenyl, lower alkoxy-phenyl, lower alkyl-alkoxy-phenyl, and lower alkyl-naphthyl radicals, and R' signifies an appropriate radical selected from the class consisting of phenyl, naphthyl, lower alkyl-phenyl, lower alkoxy-phenyl, lower alkyl-alkoxy-phenyl, lower alkyl-naphthyl, tetrahydronaphthyl, cyclohexyl, hydrocarbon-substituted cyclohexyl, lower alkyl, lower hydroxy-alkyl and N-aryl aminophenyl radicals.

5. A nondusty dry saponified rosin size composition readily dispersible in water and resistant to oxidation in the air, comprising saponified rosin stabilized with a secondary di phenyl monoamine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

6. A nondusty dry saponified rosin size composition readily dispersible in water and resistant to oxidation in the air, comprising saponified rosin stabilized with a secondary mononaphthyl monophenyl monoamine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

7. A nondusty dry saponified rosin size composition readily dispersible in water and resistant to oxidation in the air, comprising saponified rosin stabilized with a secondary N-naphthyl-substituted lower aliphatic amine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

8. A nondusty dry saponified rosin size composition readily dispersible in water and resistant to oxidation in the air, comprising saponified rosin stabilized with phenyl-beta-naphthyl-amine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

9. A nondusty dry saponified rosin size composition readily dispersible in water and resistant to oxidation in the air, comprising saponified rosin stabilized with diphenylamine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

10. A nondusty dry saponified rosin size composition readily dispersible in water and resistant to oxidation in the air, comprising saponified rosin stabilized with N-methyl-beta-naphthyl-amine in an amount sufficient to provide substantial resistance to oxidation in the air, and a wax incorporated with the saponified rosin in an amount between about 5 per cent and about 35 per cent by weight of the entire composition, said wax serving to increase the resistance of the composition to oxidation in the air and to render it substantially nondusty.

11. A nondusty dry saponified rosin size composition readily dispersible in water and resistant to oxidation in the air, comprising saponified rosin stabilized with phenyl-beta-naphthylamine in an amount sufficient to provide substantial resistance to oxidation in the air, and a paraffin wax incorporated with the saponified rosin in an amount between about 15 per cent and about 25 per cent by weight of the entire composition, said paraffin wax serving to increase the resistance of the composition to oxidation in the air and to render it substantially nondusty.

12. A nondusty dry saponified rosin size composition readily dispersible in water and resistant to oxidation in the air, comprising saponified rosin stabilized with diphenylamine in an amount sufficient to provide substantial resistance to oxidation in the air, and a paraffin wax incorporated with the saponified rosin in an amount between about 15 per cent and about 25 per cent by weight of the entire composition, said paraffin wax serving to increase the resistance of the composition to oxidation in the air and to render it substantially nondusty.

13. A nondusty dry saponified rosin size composition readily dispersible in water and resistant to oxidation in the air, comprising saponified rosin stabilized with N-methyl-beta-naphthylamine in an amount sufficient to provide substantial resistance to oxidation in the air, and a paraffin wax incorporated with the saponified rosin in an amount between about 15 per cent and about 25 per cent by weight of the entire composition, said paraffin wax serving to increase the resistance of the composition to oxidation in the air and to render it substantially nondusty.

ARTHUR C. DRESHFIELD.

REFERENCES CITED

The following references are of record in the file of this patent:

UNITED STATES PATENTS

| Number | Name | Date |
|---|---|---|
| 2,398,699 | Dreshfield | Apr. 16, 1946 |
| 2,329,694 | Bodman | Sept. 21, 1943 |
| 2,310,005 | Wilson | Feb. 2, 1943 |
| 2,294,728 | Dreshfield | Sept. 1, 1942 |
| 2,294,725 | Dreshfield | Sept. 1, 1942 |
| 2,294,724 | Dreshfield | Sept. 1, 1942 |
| 2,229,723 | Dreshfield | Sept. 1, 1942 |
| 1,692,996 | Richardson | Nov. 27, 1928 |
| 1,651,733 | Sheppard | Dec. 6, 1927 |

FOREIGN PATENTS

| Number | Country | Date |
|---|---|---|
| 463,187 | Great Britain | Mar. 23, 1937 |
| 13,104 | Great Britain | 1894 |